US008808782B2

(12) United States Patent
Arlotti et al.

(10) Patent No.: US 8,808,782 B2
(45) Date of Patent: *Aug. 19, 2014

(54) DURUM WHEAT PASTA WITH HIGH ALIMENTARY BRAN CONTENT AND PROCESS FOR THE PRODUCTION THEREOF

(75) Inventors: Guido Arlotti, Parma (IT); Francesco Panto, Parma (IT); Roberto Ranieri, Colorno (IT); Giovanni Tribuzio, Parma (IT)

(73) Assignee: Barilla G.e R. Fratelli S.p.A. (IT)

( * ) Notice: Subject to any disclaimer, the term of this patent is extended or adjusted under 35 U.S.C. 154(b) by 354 days.

This patent is subject to a terminal disclaimer.

(21) Appl. No.: 11/558,590

(22) Filed: Nov. 10, 2006

(65) Prior Publication Data

US 2007/0122537 A1   May 31, 2007

(30) Foreign Application Priority Data

Nov. 11, 2005   (EP) ...................................... 05425791

(51) Int. Cl.
| | |
|---|---|
| *A23L 1/16* | (2006.01) |
| *A21D 13/02* | (2006.01) |
| *A23L 1/10* | (2006.01) |
| *B02B 3/00* | (2006.01) |

(52) U.S. Cl.
CPC . *A21D 13/02* (2013.01); *A23L 1/16* (2013.01); *A23L 1/1016* (2013.01); *B02B 3/00* (2013.01)
USPC ........... 426/557; 426/451; 426/478; 426/479; 426/481; 426/482; 426/483

(58) Field of Classification Search
USPC ......... 426/622, 557, 451, 478, 479, 481, 482, 426/483
See application file for complete search history.

(56) References Cited

U.S. PATENT DOCUMENTS

| | | | | |
|---|---|---|---|---|
| 3,717,480 | A | * | 2/1973 | Guichard et al. .............. 426/482 |
| 4,915,960 | A | * | 4/1990 | Holmgren ....................... 426/31 |

(Continued)

FOREIGN PATENT DOCUMENTS

| | | |
|---|---|---|
| EP | 0 295 774 A2 | 12/1988 |
| EP | 0 335 174 A2 | 10/1989 |

(Continued)

OTHER PUBLICATIONS

Britannica Online Encyclopedia, Bran, Encyclopedia Britannica Online, Sep. 8, 2009.*

(Continued)

*Primary Examiner* — Lien T Tran
(74) *Attorney, Agent, or Firm* — Akerman LLP (57) ABSTRACT

A durum wheat pasta containing bran, wherein the bran has a total fiber content comprised between 30 and 36% and a protein content comprised between 15 and 19% (% in weight of the total weight of the bran); such pasta preferably has a bran content comprised between 5 and 30% and is produced by a process which comprises the steps of a) subjecting durum wheat caryopses (101) to sequential abrasion process phases in order to substantially remove the bran coating, thereby obtaining different bran fractions, the latter of which (D) originates from the removal of the aleurone, nucellar and testa layers; b) adding the latter bran fraction (D) to a durum wheat semolina (S) substantially free of bran in a quantity such to obtain a mixture (C) containing from 5 to 30% of the total weight of bran fraction (D); c) producing the pasta by means of conventional techniques starting from said mixture (C); the invention furthermore refers to a durum wheat semolina composition having a fiber content comprised between 30 and 36% and a protein content comprised between 15 and 19% and to a process for its production.

13 Claims, 3 Drawing Sheets

(56) References Cited

U.S. PATENT DOCUMENTS

| | | | |
|---|---|---|---|
| 5,395,639 A | * | 3/1995 | Chawan et al. .............. 426/557 |
| 6,899,907 B1 | | 5/2005 | Monsalve-Gonzalez et al. |
| 2005/0136174 A1 | | 6/2005 | Korolchuk et al. |
| 2005/0255219 A1 | * | 11/2005 | Dreese et al. .............. 426/622 |

FOREIGN PATENT DOCUMENTS

| | | |
|---|---|---|
| EP | 0 373 274 A1 | 6/1990 |
| WO | WO 2004/028694 A1 | 4/2004 |

OTHER PUBLICATIONS

Y. Pomeranz, "Wheat: Chemistry and Technology", American Association of Cereal Chemists, Inc., Third Edition, 1988, vol. 1, pp. 47-95.
C. Antoine, "Interet Nutritionnel de la couche a aleurone du Grain de ble", Industries des Cereales, No. 133, Jun./Jul. 2003, pp. 4-10.
B. Godon, "Bioconversion of Cereal Products", Wiley-Vch, First Edition, Nov. 1993, pp. 1-19.
L. Marquart, "Whole Grains and Health—Past, Present and Future", American Institute of Baking Technical Bulletin, vol. XXV, Issue 2, Feb. 2003, pp. 1-14.
Whole Grain Definition, Cereal Foods World, vol. 45, No. 79, 2000.
USDA/USDHHS, "Nutrition and Your Health: Dietary Guidelines for Americans", Fifth Edition, Home and Garden Bulletin No. 232, May 2000.
USDA/USDHHS, "Dietary Guidelines for Americans", Jan. 12, 2005, www.healthierus.gov/dietaryguidelines.
F. Esposito, "Antioxidant Activity and Dietary Fibre in Durum Wheat Bran By-Products", Food Research International, vol. 38, 2003, pp. 1167-1173.
E. Decker, "Whole Grains as a Source of Antioxidants", Cereal Foods World, vol. 47, No. 8, Oct. 2002, pp. 370-373.
M. Bartkin, "Chemical Composition and the Nutritive VAlue of Wheat Bran", World Rev. Nutr. Diet. Basel, Karger, 1998, vol. 60, pp. 92-131.
C. Stauffer, "Promise of Whole Grains", Bakers Production Manual, May 2003, pp. 12-24.
E. Rimm, "Vegetable, Fruit, and Cereal Fiber Intake and Risk of Coronary Heart Disease Among Men", Journal of the American Medical Association, 1996, vol. 275, No. 6, 447-451.
A. Wolk, "Long Term Intake of Dietary Fiber and Decreased Risk of Coronary Heart Disease Among Women", Journal of the American Medical Association, 1999, vol. 281, No. 21.
D. Jacobs, "Is Whole Grain Intake Associated with Reduced Total and Cause-Specific Death Rates in Older Women? The Iowa Women's Health Study", JAMA, 1999, 1998-2004.
S. Liu, "Whole-Grain Consumption and Risk of Coronary Heart Disease: Results from the Nurses' Health Study", American Journal of Clinical Nutrition, 1999, vol. 70, pp. 412-419.
J. Anderson, "Whole-Grain Foods in Health and Disease", American Association of Cereal Chemists, Inc., 2002, pp. 187-201.
D. Jenkins, "Wholemeal vs. Wholegrain Breads: Proportion of Whole or Cracked Grain and the Glycaemic Response", BMJ, vol. 297, 1988, pp. 958-960.
D. Ludwig, "Dietary Fiber, Weight Gain, and Cardiovascular Disease Risk Factors in Young Adults", JAMA, 1999, vol. 282, No. 16, pp. 1539-1546.
M. Pereira, "Whole Grain Consumption and Body Weight Regulation", American Association of Cereal Chemists, Inc. 2002, pp. 233-242.
K. Meyer, "Carbohydrates, Dietary Fiber, and Incident Type 2 Diabetes in Older Women", American Journal of Clinical Nutrition, 2002, vol. 76, pp. 921-930.
T. Fung, Whole-Grain Intake and the Risk of Type 2 Diabetes: a Prospective Study in Men, American Journal of Clinical Nutrition, 2002, vol. 76, pp. 535-540.
D. Jacobs, "Whole-Grain Intake and Cancer: An Expanded Review and Meta-Analysis", Nutrition and cancer, 1998, vol. 30, No. 2, pp. 85-89.
D. Jacobs, "Fiber from Whole Grains, but not Refined Grains, is Inversely Associated with All-Cause Mortality in Older Women: The Iowa Women's Health Study", JACN, 19(3).
T. Galliard, "Rancidity in Cereal Products", Elsevier Applied Science, Second Edition, 1994, pp. 141-160.
R. C. Buri, "Description and Characterization of Wheat Aleurone", Cereal Foods World, Sep./Oct. 2004, vol. 49, No. 5, pp. 274-282.
J.E. Dexter, "Recent Applications of Debranning of Wheat Before Milling", Trends in Food Science and Technology, vol. 7, No. 2, Feb. 1996, pp. 35-41.
M.A. Pagani, "Effect of the Debranning Process on Durum What Quality", International Food Information Service, 1996.
Z. Mousia, "Effect of Wheat Pearling on on Flour Quality", Biosciences Information Service, 2004.

* cited by examiner

Fig. 3

DURUM WHEAT PASTA WITH HIGH ALIMENTARY BRAN CONTENT AND PROCESS FOR THE PRODUCTION THEREOF

FIELD OF APPLICATION

The present invention regards the food industry sector and in particular refers to a durum wheat pasta (*Triticum turgidum* var. *durum*, Desf.) having a high dietary bran content, to a process for the production thereof, and to a durum wheat semolina having a high dietary fibre content used in such process.

PRIOR ART

Cereals (mainly wheat, rice, corn, barley, oat, rye) are consumed across the world as staple food, because they are a primary source of carbohydrates thanks to the high starch content of the endosperm, which is situated in the central part of the caryopsis (see FIG. 1) and represents its major constituent.

Figure 1:
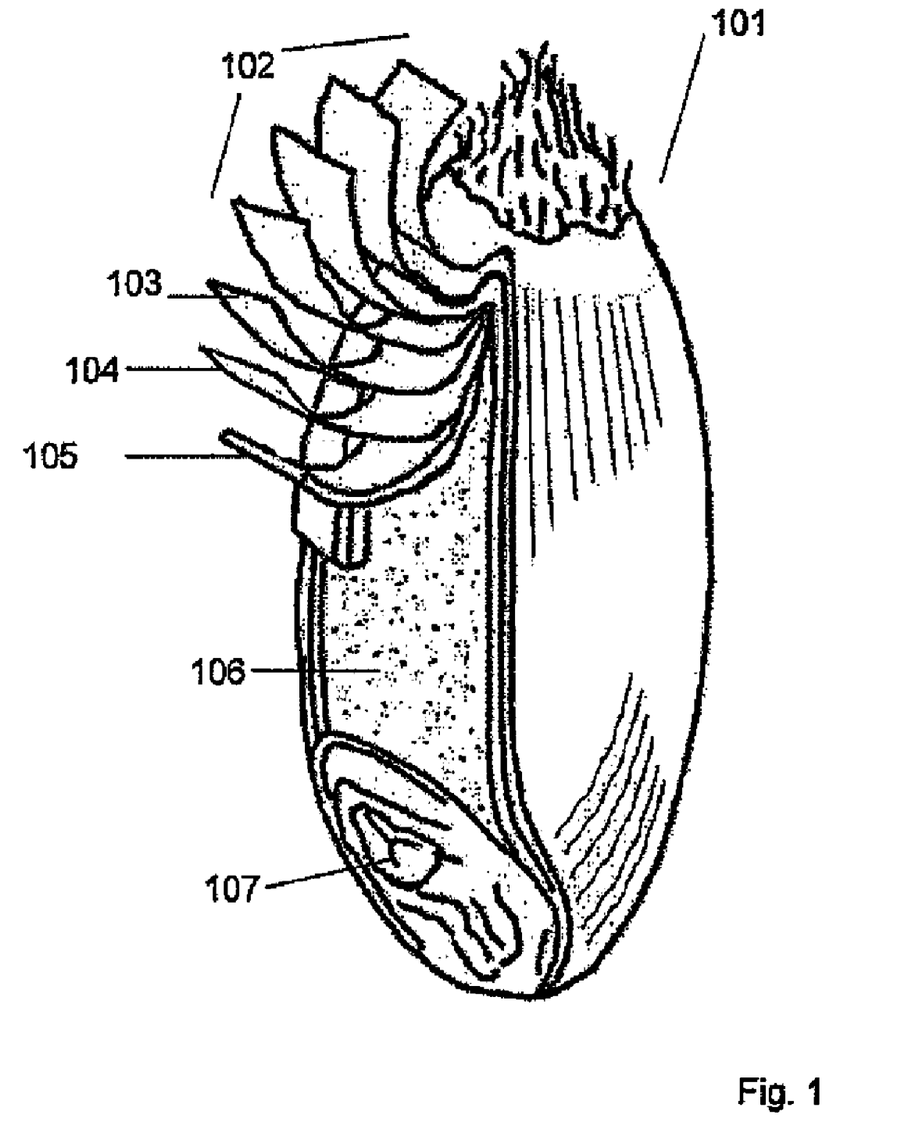
In FIG. 1 a durum wheat caryopsis is schematically illustrated.

With reference to FIG. 1, the structure of the durum wheat caryopsis 101 is briefly reviewed. Going from the outside inwards, there are the following layers composing the bran: four cell layers (longitudinal, transverse, crossed and tubular) which together compose the coating of the fruit or pericarp 102 (3-6% in weight of the total weight of the caryopsis), and then testa 103, nucellar layer (or hyaline layer) 104 and aleurone 105, which together form the coat of the seed (1, 2, 3). The inner part is composed of the endosperm 106 and germ 107.

The aleuronic layer, which makes up 5-7% in weight of the total weight of the caryopsis, is composed of a layer of polygonal cells of large size in contact with the endosperm (1, 2).

Semolina is the main product of the durum wheat milling process, the primary objective of which is the achievement of a final product with a high degree of purity (sifted). It is composed of the starchy, innermost parts of the caryopsis (endosperm) following separation from the outermost parts (the bran, which composes about 15% of the total content of the caryopsis, and the germ, which composes about 3%), traditionally intended for animal feed.

Based on this view, the modern process of industrial milling of durum wheat tends to maximise the efficiency of this separation through a series of many operations (milling, sifting) which permits the separation and removal of the bran from the parts of the endosperm which will make up the final semolina.

During the last decade, the nutritional value of "whole grain" cereal flours, i.e. those including the greatest possible quantity of the starting components of the caryopsis (4, 5), and therefore also the bran, has been progressively recognised (6, 7) as a fundamental element of a healthy diet aimed at maintaining a good state of health for the human being.

A complex series of micro-nutrients are located in the bran, such as dietary fibres (insoluble and soluble), minerals, lipids, vitamins and a class of components known as "phytochemicals", having protective activity (anti-oxidant) in cell metabolism and in phenomena linked to ageing (8, 9, 10, 11, 12). To date, there have been many studies and demonstrations of the beneficial effect of the daily consumption of whole grain products in relation to different types of pathologies (13-27).

In spite of the better nutritional properties of whole grain flours, their consumption in the form of pasta and bakery products, and their appeal, is currently hampered by the perceived organoleptic difference compared to the corresponding finished products obtained from refined flours.

The available whole grain products are penalised by a number of negative organoleptic elements including appearance (dark colour), texture (rough, heavy), a marked flavour often associated to the development of off-flavours over time (rancid, cardboard), which strongly limit their use.

Because of this, the consumption of whole grain cereals in the form of whole grain pastas or bakery products, even though it is recognised as healthier, is associated to a sense of "dissatisfaction or punishment" from the organoleptic standpoint.

Whole grain flours are conventionally produced in the manner described below.

First, there is the breaking (milling) of the whole caryopses, followed by the separation by sifting of the generated fragments, which may be composed by the endosperm only or by parts of the endosperm together with bran and germ, which are sent to subsequent steps of milling and separation in order to free and separate as much as possible the parts of endosperm from the other components of the caryopsis. In the production of whole grain flour, one proceeds with a recovery of the endosperm parts, together with bran and/or actual bran fractions, which are pooled with the main flow of sifted flour.

The whole grain flours thus obtained therefore contain bran which substantially originates from all layers of the caryopsis external to the endosperm.

Semolina or cereal flour production processes which comprise a preliminary removal step of the outer layers of the caryopsis through process phases involving friction and abrasion, prior to the milling of the caryopses, have been known for many years. As examples please see the patent applications EP 0 295 774, EP 0 373 274 and WO 2004/028694. In this manner, about 75% of the bran is removed, and the subsequent steps of milling and separation from the residual bran are simplified and generally lead to improved semolina yields compared to those obtained with conventional processes.

With the aforementioned more recent processes, two or more bran layers are collected, corresponding to as many steps of friction or abrasion carried out on the caryopses. Of these parts, the first is the richest in cellulosic fibres, since it corresponds to the outermost layers of the caryopsis whereas the latter is the richest in protein, since it contains the innermost bran layers, including part of the aleuronic layer.

The actual whole grain semolinas, and those having a certain content of bran and other dietary fibres available on the market, even when they are obtained by means of one of the aforementioned processes, contain bran which is composed in an undifferentiated manner by all of the outer layers of the caryopsis, possibly previously subjected to further milling treatments in order to reduce the size of the particles, and heat stabilisation treatments in order to forestall oxidative phenomena caused by enzymatic degradations.

Also such whole grain semolina, and above all the products derived from these (pasta shapes, baked products), suffer from the same drawbacks from the organoleptic standpoint highlighted above with reference to those obtained by conventional milling processes.

SUMMARY OF THE INVENTION

The problem underlying the present invention was that of providing a durum wheat pasta with a high content of dietary fibre and preferably such as to be defined whole grain (on the basis of the Italian law, a pasta is defined as whole grain when it has an ash content comprised between 1.40 and 1.80% of the dry weight and a minimum protein content of 11.50% of the dry weight) but with organoleptic characteristics such that it results substantially comparable to those of a semolina pasta.

A similar problem was solved by a durum wheat pasta containing bran having a total fibre content comprised between 30 and 36% in weight of the total weight of the bran and a protein content comprised between 15 and 19% in weight of the total weight of the bran.

Preferably, the pasta according to the invention has a bran content comprised between 5 and 30%, advantageously between 10 and 20%, in weight of its total weight (considering an average humidity content of 12%).

The aforementioned bran mainly contains the aleuronic, nucellar and head layers of the original caryopses.

The pasta according to the present invention is produced by means of a process which comprises the steps of:

subjecting durum wheat caryopses, having an endosperm and a germ enclosed within a multilayer bran coating, the innermost layers of which correspond to the aleurone, nucellar and testa layers, to subsequent process phases involving abrasion in order to substantially remove the bran coating, thereby obtaining various bran fractions, the latter of which originates predominantly from the removal of the aforementioned aleurone, nucellar and testa layers;

adding said latter bran layer to a durum wheat semolina substantially free of bran, in such quantities as to obtain a mixture containing from 5 to 30% of the total mixture weight of said bran layer;

producing the pasta by means of conventional techniques, starting from the aforementioned mixture.

Preferably, the aforementioned durum wheat semolina is obtained by the milling of the caryopses from which the bran coating has been substantially removed, and conveniently such milling step is carried out in the same facility in which the aforementioned process phases involving abrasion take place, continuously joining the flows of the durum wheat semolina and the aforementioned latter bran fraction.

The aforementioned process phases involving abrasion are preferably carried out on caryopses which have been previously wetted with a quantity of water such as to bring their humidity content to at least 15% and then subjected to conditioning.

The aforementioned wetting step of the caryopses is preferably carried out by subjecting the caryopses to intense vibrations of a frequency comprised between 50 and 300 Hz.

The present invention moreover refers to a composition based on durum wheat semolina, characterised in that it contains a bran fraction having a total fibre content comprised between 30 and 36% in weight of the total weight of the bran fraction and a protein content comprised between 15 and 19% in weight of the total weight of the bran fraction.

Preferably, such composition based on durum wheat semolina has a bran content comprised between 5 and 30%, advantageously between 10 and 20%, in weight of its total weight.

The aforementioned bran mainly contains the aleuronic, nucellar and testa layers of the original caryopses.

The durum wheat semolina composition according to the present invention is produced with the process according to annexed claims 13-15.

In a further aspect, the invention also regards bakery products containing a bran with a total fibre content comprised between 30 and 36% in weight of the total weight of the bran and a protein content comprised between 15 and 19% in weight on the total weight of the bran.

Finally, the present invention also refers to the use of a durum wheat bran fraction containing essentially the layers of the original caryopses consisting of the aleurone, nucellar and testa layers in the production of whole grain pasta and/or whole grain bakery products.

The aforementioned durum wheat bran fraction may be utilised in the preparation of bakery products based both on durum wheat semolina and soft wheat flour (for example crackers, croissants, breadsticks etc.).

Such durum wheat bran fraction may be utilised as obtained by the abrasion step of the process according to the invention, without additional heat stabilisation or other treatments and the final products therefrom obtained (pastas, bakery products) exhibit optimal organoleptic properties, which they maintain substantially unaltered throughout their shelf-life.

DETAILED DESCRIPTION OF THE INVENTION

Figure 2:
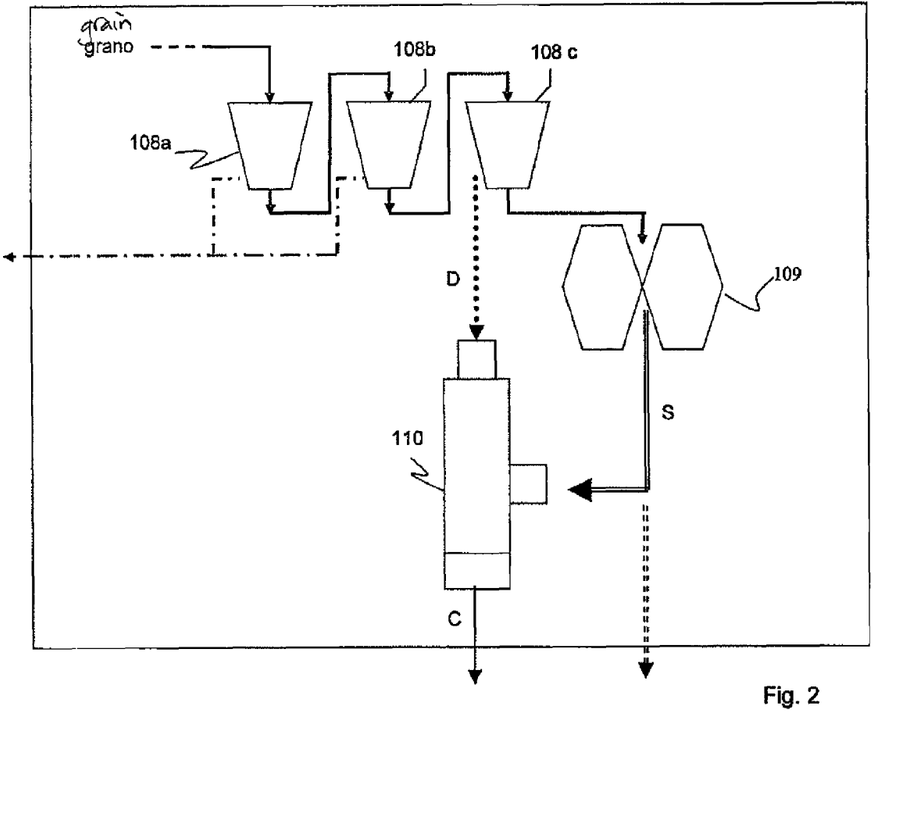
FIG. 2 is a diagram of a plant for the production of a food composition according to the present invention, according to a first embodiment.

In accordance with an embodiment of the present invention, the process for the production of a composition based on durum wheat semolina according to the invention involves the wheat caryopses 101 undergoing, prior to their rupture (milling), progressive removal of the bran layers, by subjecting the outer surface of the caryopses to the abrasive action of a plurality of decortication or abrasion machines 108a, 108b, 108c (for example 2 or 3), which a flow of wheat passes in series, one after the other (see FIG. 2).

The decortication or abrasion machines 108a, 108b, 108c comprise a vertical axis rotating shaft, on which the abrasive Carborundum grindstones are mounted. Examples of machines for the decortication apt for use in the present process are provided in the applications EP 0 373 274 and EP 0 335 174. One machine which is commercially available and useful in the present process is the machine model DECO 420R from T.A.E. The wheat, upon entering the upper part of the machine, is pushed toward the outlet situated in the lower part. In this way, the wheat is forced to spread itself in the restricted space between the rotating grindstones and a metallic containment baffle, thus undergoing an abrasive action which causes the removal of the outermost bran layers, which are recovered in the form of powder by suction.

This operation is repeated, for example, three consecutive times, thus permitting the progressive separation of increasingly internal bran layers.

With the first passing, the most superficial bran layers are removed, with the second the intermediate layers and finally with the third passing the innermost layers, those nearest to the endosperm and essentially originating from the aleurone 105, nucellar 104 and testa 103 layers, are removed.

Finally, the caryopses (101) exiting from the third abrasion machine 108c are fed into a conventional mill 109, in which they are ground, producing a flour S consisting essentially of endosperm.

Figure 3:
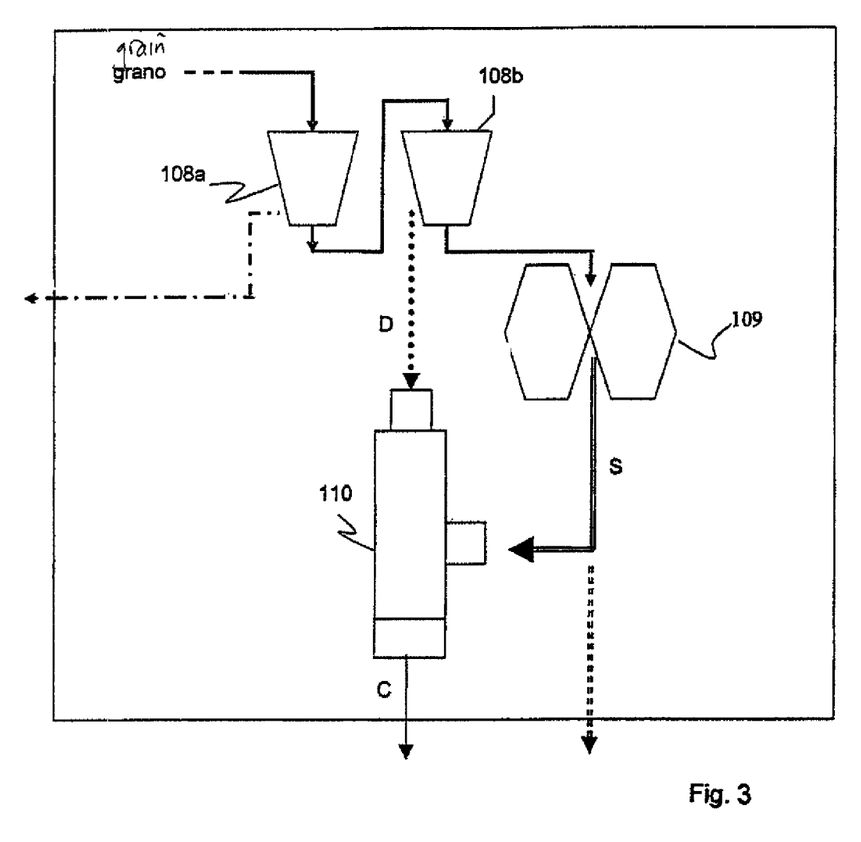
FIG. 3 is a diagram of a plant for the production of a food composition according to the present invention, according to a second embodiment.

According to an alternative embodiment, illustrated schematically in FIG. 3, the decortication process is carried out twice, utilising the machines 108a and 108b, in the first passing mostly removing the layers outside the testa layer.

For its composition characteristics (high protein level, satisfactory content of fibre, minerals, lipids, vitamins and phytochemicals), the third bran fraction D is particularly desirable so as to be joined, during the milling process, with the aforementioned flour S consisting essentially of endosperm.

An average typical composition of the third bran fraction D obtained by the process of the present invention is shown in the table 1, below.

TABLE 1

| Component | Unit | Value | Tolerance |
|---|---|---|---|
| Humidity | % | 10.0 | ±1.0 |
| Proteins (N × 5.70) | % p/p | 17.0 | ±2.0 |
| Lipids | % p/p | 6.0 | ±1.0 |
| Ash | % p/p | 5.8 | ±0.5 |
| Phosphorus | mg/100 g | 1000 | ±100 |
| Magnesium | mg/100 g | 400 | ±50 |
| Calcium | mg/100 g | 100 | ±20 |
| Totale dietary fibre | % p/p | 34.0 | ±4.0 |
| Insolubile dietary fibre | % p/p | 32.0 | ±4.0 |
| Cellulose | % p/p | 8.0 | ±2.0 |
| Solubile dietary fibre | % p/p | 1.8 | ±1.0 |
| B-glucans | % p/p | 2.7 | ±1.0 |
| Vit. E (tocopherol) | mg/100 g | 3.0 | ±0.5 |
| Vit. B1 (thiamine) | mg/100 g | 1.0 | ±0.5 |
| Vit. B2 (riboflavin) | mg/100 g | 0.5 | ±0.1 |
| Vit. B6 (pyridoxine) | mg/100 g | 0.3 | ±0.1 |
| Folic acid | µg/100 g | 60 | ±20 |
| Niacin | mg/100 g | 20 | ±10 |
| Pantothenic acid | mg/100 g | 1.0 | ±0.5 |
| Phytic acid | mg/g | 45.0 | ±5.0 |

The third decortication fraction D is transported to a doser (for example of the screw-type), and the same is done for the flow of the product S obtained by the milling of the caryopsis from which the bran coating has been removed by the above described abrasion steps. The two dosers converge in a mixer 110, which provides an effective mixing in order to provide a food composition C based on durum wheat semolina according to the invention.

Through the mixing screw and immediately before final storage, the food composition C according to the invention is conveyed towards a sifting system in order to guarantee a uniform particle size and to remove any particles excessively large in size.

The food composition based on durum wheat semolina thus obtained proves to be particularly suitable for the production of finished products such as pastas and baked products, in which the maintenance of the nutritional benefits deriving from the presence of the bran components (fibre, minerals, lipids, vitamins, phytochemicals) is associated with organoleptic characteristics of greater quality compared to pastas obtained by the use of conventional bran, in terms of flavour, colour and structure, and surprisingly similar to those of products obtained with sifted flours, that is, completely free of bran.

The organoleptic characteristics (flavour in particular) are indeed maintained substantially unaltered for the entire shelf-life of the finished product. This is remarkable, particularly considering the fact that the bran fraction of the food composition according to the invention, contrary to the consistent teachings of the prior art, does not undergo any heat stabilisation treatment.

The bran obtained with conventional milling processes is indeed subject to deterioration (rancidity, cardboard taste) even after a short period of time, due to the triggering of oxidation reactions of the lipid components present in the bran, in which there may also be present germ parts, very rich in lipids (1, 3, 28).

Normally, in the bran obtained in the conventional manner, one tries to contain and prevent this phenomenon by destroying (inactivating) the responsible agents (lipolytic enzymes) through heat (heat treatment), in order to avoid the bran fractions triggering oxidation reactions over time and therefore the production of off-flavour, in the finished products in which they are utilised.

The heat treatment of the bran, in addition to representing an additional cost, if done at excessively high temperatures may lead to a further darkening of the bran, the development of odd flavours (toasted, burnt) and the triggering of chemical degradation (by heat) due to the lipid part (28). On the other hand, by the use of excessively low temperatures, the treatment does not permit blocking of the lipolytic enzymes.

Without wishing to be bound by theory, the particular stability to oxidation of the bran fraction of the food composition according to the present invention compared to the traditional bran may be due to the fact that it is obtained with a process which involves lower mechanical and thermal stress compared to those of the conventional processes.

In addition to having the above mentioned advantages, the bran fraction of the food composition and pasta according to the present invention has the additional advantage, compared to traditional bran, of machine 108a of decortication or abrasion, comprising a vertical axis rotating shaft on which abrasive Carborundum grindstones are mounted, thus obtaining the removal of the outermost bran layers, in the form of powder recovered by suction. Two subsequent passings of the caryopses exiting from the first decorticator 108a into two other respective decortication machines 108b and 108c caused the removal of the intermediate and inner bran layers, again in the powder form.

The caryopses exiting from the third decorticator machine 108c were subjected to a dynamic air current cooling, prior to being fed to a conventional mill 109 for milling. Here the decorticated caryopses were milled according to the standard working modes for the milling of whole caryopses, obtaining in the end 85 kg of a flour S composed essentially of endosperm with an ash content of 0.77% in weight of the total weight and a protein content of 11.0% in weight of the total weight.

The third powder exiting from the last decorticator 108c was a bran fraction D characterised by the composition shown in the following table 2.

TABLE 2

| Component | Unit | Value |
|---|---|---|
| Humidity | % | 10.1 |
| Proteins (N × 5.70) | % p/p | 17.5 |
| Lipids | % p/p | 5.8 |
| Ash | % p/p | 6.0 |
| Phosphorus | mg/100 g | 1020 |
| Magnesium | mg/100 g | 355 |
| Calcium | mg/100 g | 108 |
| Totale dietary fibre | % p/p | 33.8 |
| Insolubile dietary fibre | % p/p | 31.9 |
| Cellulose | % p/p | 7.9 |
| Solubile dietary fibre | % p/p | 1.7 |
| B-glucans | % p/p | 2.9 |
| Vit. E (tocopherol) | mg/100 g | 3.1 |
| Vit. B1 (thiamine) | mg/100 g | 0.9 |
| Vit. B2 (riboflavin) | mg/100 g | 0.5 |
| Vit. B6 (pyridoxine) | mg/100 g | 0.3 |
| Folic acid | µg/100 g | 50 |
| Niacin | mg/100 g | 22 |
| Pantothenic acid | mg/100 g | 1.0 |
| Phytic acid | mg/g | 42.5 |

From the pooling of the aforementioned third bran fraction with the flour in a 1:9 weight ratio, a durum whole wheat semolina was obtained having an ash content of 1.30% and a protein content of 11.6%.

A whole grain pasta was prepared according to the present invention with the durum whole wheat semolina thus obtained, using it in the conventional production process of traditional durum wheat semolina pasta in place of the refined durum wheat semolina, by the traditional steps of kneading with water, forming by extrusion and drying to a humidity content of 12.0%.

The pasta thus prepared was subjected to comparison with semolina pasta through the evaluation by 100 regular consumers of pasta (semantic differential and liking assessment test). The pasta according to the present invention obtained an appreciation (flavour, texture) equal to supplying a greater quantity of important nutrients contained in the aleuronic layer (1, 2, 11, 29). Also the appearance is improved, since it is less dark and more yellow, as instrumentally detectable (on the basis of the chromatic scale CIELAB L*a*b*), in comparison with pastas obtained by the use of conventional bran. This is due to the smaller quantity of pigmented components located in particular in the outermost layers of the bran coating, which are capable of causing a darkening of the final products, such as pasta.

Moreover, the texture of the food composition and pasta according to the present invention is more similar to that of a semolina pasta since a reduced discontinuity is noted in the texture (granulosity), lower than that exhibited by the pastas obtained by the use of conventional bran.

Finally, the progressive application of the abrasive action, ensured by the described decortication or abrasion machines, permits the isolation and the use of a more internal bran fraction and therefore, from a hygienic-sanitary standpoint, the first two decortication passings may be considered as an additional and significant extension of the selection and cleaning steps which constitute the initial part, upstream of any milling process.

The present invention will be further described by reference to two examples, provided here below for illustrative and non-limiting purposes.

Example 1

115 kg of durum wheat previously subjected to conventional cleaning steps were wetted with a quantity of water such as to bring the humidity content of the caryopses to 16.5% and simultaneously subjected to the vibrational stresses caused by a Vibronet® machine, produced by Gräf GmbH & Co. KG, Lahnau, Germany (vibrational impulses of the duration of about 10 seconds at a frequency of 75 Hz). After a single conditioning of 5 hours, the caryopses were fed (see FIG. 2) to a first that of semolina-only pasta. In particular, appreciation was revealed for the overall flavour, for the texture and for the fragrance while the absence of acidic or bitter notes was confirmed.

A comparison between the pasta thus prepared and commercial pastas obtained with the use of conventional bran was carried out by subjecting such pastas to the judgement of 88 regular pasta consumers (sequential monadic test). The overall appreciation of the pasta thus prepared was significantly higher, in particular in terms of overall flavour, consistency, appearance and colour (both raw and cooked).

A shelf-life test was conducted in extreme storage conditions (35° C. temperature and 70% relative humidity), so as to accelerate the processes of off-flavours formation. Pasta samples thus stored were periodically evaluated by a trained tasting panel, over a period of four months, during which time neither significant variations of the organoleptic properties nor development of off-flavours were detected.

Example 2

115 kg of durum wheat previously subjected to conventional cleaning steps was wetted with a quantity of water such as to bring the humidity content of the caryopses to 16.5% and simultaneously subjected to the vibrational stresses induced by a Vibronet® machine, (vibrational impulses of the duration of about 10 seconds and at a frequency of 75 Hz). After a single conditioning of 5 hours, the caryopses 101 were fed (see FIG. 3) to a first machine 108a of decortication or abrasion, comprising a vertical axis rotating shaft on which abrasive Carborundum grindstones are mounted, arranged in such a manner as so to determine the removal of the outermost and intermediate bran layers (substantially up until the innermost layer of the pericarp), in the form of powder recovered by suction. A subsequent passing of the caryopses exiting from the first decorticator into a second decortication machine 108b caused the removal of the innermost bran layers, again in the powder form.

The caryopses exiting the second decorticator machine 108b were subjected to a dynamic air current cooling, prior to being fed to a conventional mill 109 for milling. Here the decorticated caryopses were milled according to the standard working modes for the milling of whole caryopses, obtaining in the end 84 kg of a flour consisting essentially of endosperm with an ash content of 0.75% in weight of the total weight and a protein content of 11.8% in weight of the total weight.

The powder exiting from the second decorticator was a bran fraction D characterised by the composition shown in table 3 below.

TABLE 3

| Componente | Unit | Value |
|---|---|---|
| Humidity | % | 10.2 |
| Proteins (N × 5.70) | % p/p | 17.3 |
| Lipids | % p/p | 5.9 |
| Ash | % p/p | 5.8 |
| Phosphorus | mg/100 g | 1010 |
| Magnesium | mg/100 g | 365 |
| Calcium | mg/100 g | 110 |
| Totale dietary fibre | % p/p | 34.8 |
| Insolubile dietary fibre | % p/p | 32.9 |
| Cellulose | % p/p | 8.0 |
| Soluble dietary fibre | % p/p | 1.7 |
| B-glucans | % p/p | 2.7 |
| Vit. E (tocopherol) | mg/100 g | 3.0 |
| Vit. B1 (thiamine) | mg/100 g | 0.9 |
| Vit. B2 (riboflavin) | mg/100 g | 0.5 |
| Vit. B6 (pyridoxine) | mg/100 g | 0.3 |
| Folic acid | µg/100 g | 51 |
| Niacin | mg/100 g | 22 |
| Pantothenic acid | mg/100 g | 1.0 |
| Phytic acid | mg/g | 48.0 |

From the pooling of the aforementioned second bran fraction D with the flour S in a 1:9 weight ratio, a durum whole wheat semolina was obtained having an ash content of 1.26% and a protein content of 12.4%.

REFERENCES

1) Y. Pomeranz, Wheat chemistry and Technology, Volume I, 47-95, Ed. AACC, Thrid edition, 1988
2) Antoine C., Lullien-Pellerin V., Abecassis J., Rouau X.—Intéret nutritionnel de la couche à aleurone du grain de blé, Industries des céréales, n° 133, Juin/Juillet, 4-10, 2003.

3) B. Godon, Bioconversion of Cereal Products, 1ˢᵗ Ed., November 1993 Wiley-Vch, pp 18-19
4) Marquart L., Fulcher G., Slavin J. Whole grain and Health Past, Present, and Future. American Inst. of Baking Technical Bulletin, Volume XXV, Issue 2, February 2003
5) CFW. Whole Grain Definition. Cereal Food World, 45: 79, 2000
6) USDA/USDHHS. Nutrition and Your Heath: Dietary Guidelines for Americans, 5ᵗʰ ed. U.S. Department of Agriculture/U.S. Department of heath and Human Service. U.S. Government Printing Office, Home and Garden Bulletin No. 232, Washington, D.C., May 2000
7) USDA/USDHHS. Dietary Guidelines for Americans 2005, Jan. 12, 2005, www.healthierus.gov/dietaryguidelines
8) F. Esposito, G. Arlotti, A. M. Bonifati, A. Napolitano, D. Vitale, V. Fogliano, Antioxidant activity and dietary fibre in durum wheat bran by-products, Food Research International 38, 1167-1173, 2005
9) L. Marquart, G. Fulcher, J. Slavin, Whole Grain and Health; Past, Present and Future, AIB Tech. Bul., 1-14, Vol. XXV, Issue 2, February 2003
10) E. Decker, G. Beecher, J. Slavin, H. E. Miller, L. Marquart, Whole Grain as a Source of Antioxidants, Cereal Foods World, 370-373, Vol. 47, NO8, September-October, 2002
11) M. Bartinik, T. Jakubczyk, Chemical Composition and the Nutritive Value of Wheat Bran World Rev. Nutr. Diet. Basel, Karger, 1998, vol. 60, pp 92-131
12) C. E. Stauffer, Promise of Whole Grains, Bakers Production Manual, 12-24, May 2003
13) Rimm E. B., Ascerio A., Giovannucci E., Spiegelman D., Stampfer M. J., Willett W. C. Vegetable, fruit and cereal fiber intake and risk of coronary heart disease among men. Journal of the American Medical Association 275: 447-451, 1996
14) Wolk A., Manson J. E., Stampfer M. J., Colditz G. A., Hu F. B., Speizer F. E., Hennerkens C. H., Willett W. C., Long-term intake of dietary fibre and decrease risk of coronary heart disease among women, JAMA, 1998-2004, 1999
15) Jacobs D. J., Meyer K. A:, Kushi L. H., Folsom A. R. Is whole grain intake associated with reduced total and cause specific death rates in older women? The Iowa Women's Health Study. Am. J. Public Health, 89 (3), 1-8, 1999
16) Liu S. M., Stampfer M. J., Hu F. B., Giovannucci E., Rimm E., Manson J. E., Hennekens C. H. and Willett W. C., Whole-grain consumption and risk of coronary disease: results from the Nurses' Health Study. American Journal of Clinical Nutrition, 70, 412-419, 1999
17) Anderson J. W., Whole-grain intake and risk for coronary heart disease. In: Whole-Grain Foods in Heart and Disease (Marquat, Slavin and Fulcher, eds.), American Association of cereal Chemists, Inc., St. Paul, Minn., 2002
18) Johnston L., Reynolds H. R., Patz M., Hunninnghake D. B., Schulz K., Westereng B. Cholesterol-lowering benefits of a whole grain oat ready-to-eat cereal. Nutrition in Clinical Care 1 (1), 6-12, 1998
19) Jenkins D., Wesson V., Wolever T. M., Jenkins A. L., Kalmusky J., Gidici S., Csima A., Josse R. G., Wong G. S. Whole meal versus whole grain breads: proportion of whole or cracked grain and the glycemic response. Br. Med. J. 297, 958-960, 1988
20) Pereira M. A., Jacobs D. R. Jr., Slattery M. L., Ruth k., Van Horn L., Hilner j., Kushi L. H., the association of whole grain intake and fasting insulin in a biracial cohort of young adults: The CARDIA Study. CVD Prevention, 1, 231-242, 1998
21) Ludwing D. S., Pereira M. A., Kroenke C. H., Hilner J. E., Van Horn L., Slattery M. L., Jacobs D. R., Jr. Dietary fibre, weight gain, and cardiovascular disease risk factors in young adults. JAMA, 1539-1546, 1999
22) Pereira M. A., Whole grain consumption and body weight regulation. In: Whole-Grain Foods in Heart and Disease (Marquat, Slavin and Fulcher, eds.), American Association of cereal Chemists, Inc., St. Paul, Minn., 2002
23) Meyer K. A:, Kushi L. H., Jacobs Jr. D. R., Slavin J., Sellers T. A. and Folsom A. R. Carbohydrates, dietary fiber, and incident type 2 diabetes in older women. American Journal of Clinical Nutrition, 71, 921-930, 2000
24) Fung T. T., Hu F. B., Pereira M. A., Liu S., Stampfer M. J., Colditz G. A., Hennekens C. H. and Willett W. C. Whole-grain intake and the risk of type 2 diabetes: a prospective study in men. American Journal of Clinical Nutrition, 76, 535-540, 2002
25) Jacobs D. R., Marquart L., Slavin J., and Kushi, L. H. Whole grain intake and cancer: an expanded review and meta-analysis. Nutrition and Cancer, 30, 85-89, 1998
26) Jacobs D. J., Meyer K. A:, Kushi L. H., Folsom A. R. Is whole grain intake associated with reduced total and cause specific death rates in older women? The Iowa Women's Health Study. Am. J. Public Health, 89 (3), 322-329, 1999
27) Jacobs D. J., Pereira M. A., Meyer K. A and Kushi L. H. Fiber from whole grains, but not refined grains, is inversely associated with all cause mortality in older women: The Iowa Women's Health Study. Journal of the American College of Nutrition, 19, 326S-330S, 2000
28) T. Galliard, "Rancidity in Cereal Product", 141-160, in J. C. Allen nd R. J. Hamilton "Rancidy of Food", Elsevier Applied Science, 2nd Ed., 1994
29) Buri R. C., von Reading W., Gavin M. H., Description and Characterization of Wheat Aleurone, Cereal Foods World, Vol. 49, 5, September-October, 74-282, 2004

What is claimed is:

1. A durum wheat pasta containing bran, said bran originating from durum wheat caryopses, wherein said bran has a total fibre content comprised between 30 and 36% in weight of the total weight of the bran and a protein content comprised between 15 and 19% in weight of the total weight of the bran, wherein said bran consists of the aleurone, nucellar and testa layers of the caryopses only such that said bran has stability to oxidation without heat treatment and the organoleptic characteristics of said durum wheat pasta are maintained substantially unaltered for a shelf-life of the pasta.

2. The pasta according to claim 1, having a bran content comprised between 5 and 30% in weight of the total weight of the pasta.

3. The pasta according to claim 2, having a bran content comprised between 10 and 20% in weight of the total weight thereof.

4. A process for the production of pasta according to claim 1, comprising the steps of:
subjecting durum wheat caryopses, having an endosperm and a germ enclosed in a multilayer bran coating, the innermost layers of which correspond to aleurone, nucellar and testa layers, to sequential abrasion process steps in order to substantially remove said bran coating, thereby obtaining different bran fractions, wherein a latter of said bran fractions originates from the removal of the aforementioned aleurone, nucellar layer and testa layers only such that said latter bran fraction exhibits stability to oxidation without undergoing heat stabilization treatment, and wherein said latter bran fraction includes a protein content comprised between 15 and 19% in weight of the total weight of the bran;

adding said latter bran fraction to a durum wheat semolina substantially free of bran, in a quantity such as to obtain a mixture containing from 5 to 30% of the total weight of said mixture of said latter bran fraction; and producing said pasta starting from said mixture.

5. The process according to claim 4, wherein said durum wheat semolina is obtained by the milling of said caryopses from which said bran coating has been substantially removed.

6. The process according to claim 5, said process being carried out in a plant, wherein the milling of said caryopses is carried out in the plant in which the abrasion process steps are carried out and in which the durum wheat semolina obtained from the milling and said latter bran fraction are continuously pooled.

7. The process according to claims from 4, wherein said abrasion process phases are carried out on caryopses which have been previously wetted with a quantity of water such as to bring the humidity content thereof to at least 15% and then subjected to conditioning.

8. A durum wheat semolina-based food composition containing bran, wherein said bran has a total fibre content comprised between 30 and 36% in weight of the total weight of the bran and a protein content comprised between 15 and 19% in weight of the total weight of the bran, wherein said bran consists of the aleurone, nucellar and testa layers of the caryopses only, such that said bran possesses stability to oxidation without undergoing heat stabilization treatment.

9. The food composition according to claim 8, having a bran content comprised between 5 and 30% in weight of the total weight of the composition.

10. The food composition according to claim 9, having a bran content comprised between 10 and 20% in weight of the total weight of the composition.

11. A process for the production of a food composition according to claim 8, comprising the steps of:

subjecting durum wheat caryopses, having an endosperm and a germ enclosed in a multilayer bran coating, the innermost layers of which correspond to aleurone, nucellar and testa layers, to sequential abrasion process phases in order to substantially remove said bran coating, thereby obtaining different bran fractions, a latter of said bran fractions originates from the removal of the aforementioned aleurone, nucellar layer and testa layers only, contains a total fibre content of between 30 and 36% in weight of the bran, and possesses stability to oxidation without undergoing heat stabilization treatment;

adding said latter bran fraction to a durum wheat semolina substantially free of bran, in a quantity such as to obtain a mixture containing from 5 to 30% of the total weight of said mixture of said bran fraction.

12. The process according to claim 11, wherein said durum wheat semolina is obtained by the milling of said caryopses from which the bran coating has been substantially removed.

13. The process according to claim 12, said process being carried out in a plant, wherein the milling of said caryopses is carried out in the plant in which the abrasion process phases are carried out and in which the durum wheat semolina obtained from the milling and said latter bran fraction are continuously pooled.

* * * * *